Patented May 23, 1933

1,910,758

UNITED STATES PATENT OFFICE

MARVIN W. DUNDORE, OF BELOIT, WISCONSIN, ASSIGNOR TO BELOIT IRON WORKS, OF BELOIT, WISCONSIN, A CORPORATION OF WISCONSIN

FILTER MEDIA

No Drawing. Application filed March 7, 1929. Serial No. 345,242.

My invention relates to the manufacture of porous plates for use in filtration process and particularly adapted for use in filtering water at municipal water plants and the like because of its relative cheapness as compared to other plate filter media.

Water filters may be roughly classified into two general types, namely, slow sand filters or the English system and mechanical filters or the American system, the latter also using sand or other material as a filter bed. By way of illustration I will describe my invention in connection with the slow sand filters now commonly employed for the filtration of water at municipal water plants, and set out the benefits to be gained therein through the use of my material. These systems usually consist of several series of sedimentation and filtration basins arranged so that any portion may be closed down for periodic cleaning and repairs. The water is usually drawn from streams and conducted to the sedimentation basins where the water is held as nearly motionless as practical to permit the separation by gravity of as many of the foreign bodies carried by the water as possible. The water is then drawn from the sedimentation basins into vast filter beds and allowed to gradually seep through layers of sand of various sizes to the bottom of the beds from which it is pumped to storage basins or directly into the water mains.

The filtering beds as most commonly designed and in use consist of a masonry basin of calculated area and depth in the bottom of which may be placed drain tile or other agency for the purpose of conduction after seepage or filtration. Above this bed or floor of the basin is placed, approximately to a heighth of 24 inches, four to eight inch spalls with the object of collecting the water. On top are placed successive layers of stone, gravel, and sand until a filter bed is produced somewhat in accord with the following:

24 inches fine sand topping
6 inches one-quarter inch gravel
6 inches one-half inch gravel
6 inches one inch stone
25 inches four to eight inch spalls
66 inches total depth of filter The general object of my invention is the provision of filter plates adapted to be used in place of the loose filter media in the ordinary loose sand filter bed.

Another object is the provision of a rapid filter media in plate form at a relatively small cost.

I have also aimed to provide a plate filter media which after being used to exhaustion may be returned to free sand which may be washed and recast.

Another object is to provide a filter media in which the particles are firmly held in a fixed position causing the media to retain a fixed permeability and whereby media of varying degrees of permeability may be produced.

Various other objects and attendant advantages will become apparent to those skilled in the art from the following description and illustrations of the applications of my improved filter media.

In the preparation of my improved filter media I first take a solution of an artificial rubber isomer of the so called thermoprene type, the preparation and nature of which are more fully disclosed in U. S. Letters Patent No. 1,605,180, and in the Journal of Industrial and Engineering Chemistry of December, 1927, pages 1325 to 1333, one such material being sold under the trade mane of Vulcalock cement, to which I add about an equal volume of a volatile solvent such as gasoline, for the purpose of diluting the same, rendering it less viscous and physically more convenient for use in the ensuing operations.

I then prepare a quantity of sand such as is usually used for filtration purposes by washing and drying the latter by either air or applied heat. It will be obvious that numerous other materials may be used instead of sand, as for example crushed stone or other mineral matter of appropriate screen sizes which I have designated as a class by the term mineral aggregate. To this I add the binding solution prepared as indicated above. The proportion of binder and sand may vary considerably depending upon the characteristics desired in the finished product. I have successfully used proportions varying between fifteen parts of sand to one part of cement to forty parts of sand to one part of cement. It will be seen that the greater the percentage of binder used, other things being equal, the greater the strength and the lower the permeability of the resultant product. The binder is added to the sand preferably with continuous mixing during the addition. The binder should be thoroughly incorporated into the sand covering every particle thereof and forming a uniform mixture. This mixture of binder and sand is then ready to be cast into predetermined desired shapes. This is accomplished by loosely placing the mixture into a suitable mold and ramming in accordance with principles presently to be set forth. The molded form is then preferably placed upon steel plates or, in the case of intricate shapes, into aluminum or steel drying forms. Where the proportion of binder to sand is small say forty to one it is often necessary to permit the molded shape to stand quietly in contact with air to permit the preliminary formation of a hard surface layer in order to have the mass retain its shape during handling preparatory to heating. In the case of lightly bound materials, aluminum or metallic drying forms may also advantageously be used to cause the molded form to retain its shape before and during the heating period. However, when the proportion of binder is relatively large such preliminary air drying is unnecessary and the molded article will retain its shape during heating.

The molded forms are then charged into suitable ovens heated to a temperature of preferably 425° F. to 600° F. the exact temperature used apparently not being important. I have found that temperatures varying between 375° F. and 900° F. may be used without affecting the shape or quality of the resultant material, but the more limited temperatures indicated above appear to give slightly better results. It will be apparent that the time for which the heating must be carried on will be dependent upon a number of factors. The cast forms must necessarily be heated thoroughly through, the body of the form acquiring the temperature of the oven. I have found it beneficial to remove the entire quantity of solvent or diluent used with the binder, and therefore, the volume of sand being treated and the quantity of binder therein as well as the rate of evaporation of the solvent will effect the heating time. The result of this heating process upon the molded material should be the production of a hard, somewhat tough, rigid material. This result amounts to more than the mere drying of the solvent from the binder, a chemical change therein very evidently being produced. Whether or not time must be allowed for this chemical change to take place I do not know, but if such be the case the reaction appears to be completed by the time the solvent has been removed from the molded article.

The product of this process will be found to be a hard, somewhat tough, mass consisting essentially of sand, bounded together by a small quantity of heat plastic rubber isomer. The strength of the product may be varied within wide limits depending upon the sieve test of the sand, the quantity of binder used and the amount of ramming or packing employed in the molding of the article. It will be evident that if a large quantity of binder is used with a fine sand and the mixture is closely packed, the resultant product will be a material having a high compressive strength, a low permeability, and a low filtering rate; conversely, if a small proportion of binder be used with a sand of large grain size and the mass be but lightly packed the interstices between the grains will consist essentially of air spaces, there will be a greater percentage of voids, the grains will be less securely held resulting in a small compressive strength, and the filtering rate will be correspondingly increased. Intermediate characteristics may be developed by varying any one, or any number of the above factors.

*Example 1.*—A binder and sand mixture having thirty parts by volume of a thirty-five mesh sand and one part by volume of a diluted cement was prepared. The mixture was molded into a flat slab of one-half inch thickness and the slab heat treated at 500° F. for a period of one hour. The mold was packed comparatively close but not tightly rammed. The compressive strengths of two slabs prepared in this manner where 666 and 617 pounds per square inch, the permeabilities were 168 and 198 respectively, and the rate of filtration essentially the same, being about 240 gallons per square foot per twenty-four hours.

*Example 2.*—A mixture of thirty parts by volume of a thirty-five to sixty-five mesh sand and one part by volume of a diluted cement, was loosely cast into slabs of three-quarter inch thickness. These slabs were heat treated for one and one-fourth hours at a temperature of about 500° F. The compressive strengths were 593 and 556 and the permeabilities 398 and 440 respectively. The rate of filtration through these slabs amounted to approximately 12,000 gallons per square foot per twenty-four hours.

*Example 3.*—A mixture of forty parts by volume of a thirty-five mesh sand and one part by volume of a diluted cement was molded with moderate packing into a slab one and one-half inches thick. The slab was heat treated for two hours at 550° F. and when cooled had a compressive strength of 500° F. The rate of filtration through this slab amounted to 360 gallons per square foot per twenty-four hours.

*Example 4.*—A mixture of forty parts by volume of a sixty-five mesh sand and one part by volume of a diluted cement was molded with no packing into a slab four and one-half inches thick. The slab was heat treated for four hours at 500° F. The rate of filtration amounted to 838 gallons per square foot per twenty-four hours, removing turbidity from water.

The finished material will, of course, be subject to a large variety of treatments to impart other desirable characteristics. I have, for example, found it advantageous in the case of slabs to treat the finished slabs along the sides or edges with a further quantity of the binder to increase the strength of the slab. This forms a strong outer edge reducing the filtering efficiency in that portion but not substantially effecting the center portions. Other materials as slate, lime, coloring matter and the like may be incorporated in the filter to adapt it to specific purposes.

It will be seen that insofar as the cost of production is concerned my improved filter material media is adapted to be used in the place of complicated built up filter medias commonly used in the slow sand filters of the English system. Because of the greater compactness of my filter media the size of the filter beds employing the same would be considerably less, reducing the cost of installation and valuable land.

One of the serious disadvantages to the loose filter beds of the prior art is the danger of disturbing the sand by too rapid flow of water thereover. Since the particles in my improved media are bound together and firmly held, this danger is completely obviated by the use thereof. This is equally true when we consider the tendency of the loose beds of the prior art to develop channels therein through which the water may flow with inadequate filtration. My cast media will obviously completely eliminate this danger.

The exact rate of filtration in the loose beds is very difficult if not impossible to determine in advance. On the other hand the cast media may be prepared with any degree of permeability or porosity and by simple tests the rate of filtration may be accurately predetermined thus lending greater exactness to the design and operation of the filter beds. Still another difficulty common to the loose types of filter beds is the frequent compacting of the sand by the pressure of the water, thus partially or completely stopping the flow or seepage of water therethrough. This, too, will be completely eliminated by the use of bound filter media wherein the particles are not free to move from position to position. The old type of filter beds do not permit of double or triple filtration except by complete duplication of beds requiring additional land area and equipment. Because of the strength of slabs or other shapes prepared according to my process double or triple filtration will be accomplished by installing filter layers one above the other horizontally, a series of filtrations being accomplished by vertically spacing the filter layers.

It will be evident that my improved filter media may be prepared from essentially the same materials now being used for filtration and may be prepared at the filtration plant thus adding no additional cost for shipping the material in block form. The blocks may be superimposed one upon the other to any desired thickness and the necessity for gravel and spalls is completely eliminated. When the interstices of the molded media are filled with silt organic matter or other fine particles the blocks may be purged by reversing the flow of water to wash out the surface thereof or steam may be brought therethrough. The tedious process of cleaning and raking the sand surface of the filter bed is therefore eliminated. The interstices between the grains of sand in the molded block will, however, gradually become filled and require replacement. This, however, does not necessitate the rejection of the sand contained therein. The molded forms may be heated to excessive temperatures whereby the binder is destroyed and the sand reverted to free flowing sand. This sand may again be used in the molding of filter media.

By the substitution of these molded media for the filter beds of the prior art the tedious and laborious operation of removing and replacing the successive layers of sand, gravel and spalls is completely eliminated.

The molded media may be placed and removed in block or slab form of convenient size for handling. Where successive layers of slabs are employed the lower layers thereof need seldom be removed. Most of the fine particles will be filtered from the water by the upper layer and reconditioning of the bed need only involve the removal of this upper clogged layer, which may be expediently performed, since there is no tendency toward intermingling of the various layers of strata of the bed as occurs in the loose sand filter beds. In addition it will be seen that the filtration will be uniform throughout the surface area of the bed, since the bed may be uniformly constructed and the components thereof are held immovable.

I have described and illustrated the application of my invention to a specific method of filtration but it will be evident to those skilled in the art that my invention is equally applicable to other methods and forms of filtration, such for example as the filtration of gases and the removal of solid particles from liquids in various types of industrial processes. I am aware that numerous changes may be made in my process and product without materially departing from the spirit of the invention, as set forth in the specification and claimed in the appended claims in which—

I claim:

1. A process for making filter media comprising mixing a mineral aggregate with a binder including a heat plastic rubber isomer, holding the treated aggregate to a desired porosity, treating a portion of the molded shape with said binder to reenforce the shape, and heating the molded aggregate to harden and set the binding material.

2. A process for making filter media comprising mixing a mineral aggregate of inert mineral with a binder including a heat plastic rubber isomer and a solvent therefor, molding the treated aggregate to a desired porosity and heating the molded aggregate to remove the solvent and to harden the binding material.

3. A process for making filter media comprising mixing a mineral aggregate of inert mineral with a binder including a heat plastic rubber isomer of the gutta-percha type and a volatile, inflammable, solvent therefor, molding the treated aggregate to a desired porosity, and heating the molded aggregate to remove the solvent and to harden the binding material.

4. A process for making filter media comprising mixing sand with a binder including a thermoprene cement and a volatile liquid miscible therewith, molding the treated sand to a desired porosity, and heating the molded mixture at a temperature between 375 and 900° F. until the liquid has been substantially removed therefrom.

5. A filter media comprising a mineral aggregate having a heat plastic rubber isomer as a binder.

6. A filter media having porous structure capable of transmitting liquids therethrough and composed in part of a mineral aggregate bound by a material formed in the heating of a heat plastic rubber isomer of the gutta-percha type.

7. A filter media having a porous structure capable of transmitting water therethrough and composed in part of sand and a material obtained by heating thermoprene cement to a temperature between about 375 and 900° F.

8. A filter media having a porous structure capable of transmitting liquids therethrough and having the property of reverting to a free flowing aggregate upon being heated to a predetermined temperature, composed in part of an aggregate of solid particles inert to said liquids, and a binder of a heat plastic rubber isomer.

In witness of the foregoing I affix my signature.

MARVIN W. DUNDORE.

CERTIFICATE OF CORRECTION.

Patent No. 1,910,758.                                                                                     May 23, 1933.

MARVIN W. DUNDORE.

It is hereby certified that error appears in the printed specification of the above numbered patent requiring correction as follows: Page 4, line 11, claim 1, for "holding" read molding"; lines 18 and 26, claims 2 and 3, respectively, for "mineral" read "material"; and that the said Letters Patent should be read with these corrections therein that the same may conform to the record of the case in the Patent Office.

Signed and sealed this 8th day of August, A. D. 1933.

M. J. Moore.

(Seal)                                                                          Acting Commissioner of Patents.